US008503671B2

(12) United States Patent
Chen

(10) Patent No.: US 8,503,671 B2
(45) Date of Patent: *Aug. 6, 2013

(54) METHOD AND APPARATUS FOR USING COUNTER-MODE ENCRYPTION TO PROTECT IMAGE DATA IN FRAME BUFFER OF A VIDEO COMPRESSION SYSTEM

(75) Inventor: Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/326,984

(22) Filed: Dec. 15, 2011

(65) Prior Publication Data

US 2012/0087498 A1    Apr. 12, 2012

Related U.S. Application Data

(63) Continuation of application No. 11/135,906, filed on May 24, 2005, now Pat. No. 8,094,814.

(60) Provisional application No. 60/668,395, filed on Apr. 5, 2005.

(51) Int. Cl.
*H04L 29/06* (2006.01)

(52) U.S. Cl.
USPC .............................................. 380/29; 380/217

(58) Field of Classification Search
USPC ........................................ 380/210, 29, 217
See application file for complete search history.

(56) References Cited

U.S. PATENT DOCUMENTS

| 5,691,768 | A | * | 11/1997 | Civanlar et al. | 375/240.01 |
|---|---|---|---|---|---|
| 6,011,566 | A | * | 1/2000 | Salamon | 345/600 |
| 6,222,926 | B1 | * | 4/2001 | Cavallerano et al. | 380/214 |
| 6,226,384 | B1 | * | 5/2001 | Cavallerano et al. | 380/214 |
| 6,285,774 | B1 | * | 9/2001 | Schumann et al. | 382/100 |
| 7,016,417 | B1 | * | 3/2006 | Roman et al. | 375/240.23 |
| 7,228,437 | B2 | * | 6/2007 | Spagna et al. | 713/193 |
| 7,242,766 | B1 | * | 7/2007 | Lyle | 380/2 |
| 7,318,187 | B2 | * | 1/2008 | Vayanos et al. | 714/776 |
| 7,336,783 | B2 | * | 2/2008 | Park | 380/28 |
| 7,349,537 | B2 | * | 3/2008 | Kramer et al. | 380/28 |
| 7,509,501 | B2 | * | 3/2009 | Park et al. | 713/193 |
| 7,619,655 | B2 | * | 11/2009 | Kondo et al. | 348/208.4 |
| 7,657,757 | B2 | * | 2/2010 | Feldman | 713/191 |
| 7,809,139 | B2 | * | 10/2010 | Choi et al. | 380/210 |
| 8,001,572 | B2 | * | 8/2011 | Park et al. | 725/62 |
| 8,006,271 | B2 | * | 8/2011 | Park et al. | 725/62 |
| 8,094,814 | B2 |  | 1/2012 | Chen |  |
| 8,276,035 | B1 | * | 9/2012 | Savarese et al. | 714/749 |
| 8,300,821 | B2 | * | 10/2012 | Choi et al. | 380/255 |
| 2002/0002468 | A1 | * | 1/2002 | Spagna et al. | 705/1 |
| 2002/0004860 | A1 | * | 1/2002 | Roman | 710/22 |
| 2003/0231767 | A1 | * | 12/2003 | Carbajal | 380/200 |
| 2004/0075749 | A1 | * | 4/2004 | Kondo et al. | 348/222.1 |
| 2004/0120404 | A1 | * | 6/2004 | Sugahara et al. | 375/240.23 |
| 2004/0145661 | A1 | * | 7/2004 | Murakami et al. | 348/222.1 |
| 2004/0146158 | A1 | * | 7/2004 | Park | 380/37 |
| 2004/0174998 | A1 | * | 9/2004 | Youatt et al. | 380/210 |

(Continued)

*Primary Examiner* — David Garcia Cervetti
(74) *Attorney, Agent, or Firm* — Sterne, Kessler, Goldstein & Fox P.L.L.C.

(57) ABSTRACT

Certain aspects for protecting image data in a video compression system may include encrypting image data utilizing counter-mode scrambling. The encrypted image data may be buffered in at least one frame buffer. The buffered encrypted image data may be decrypted by utilizing counter-mode descrambling.

20 Claims, 14 Drawing Sheets

U.S. PATENT DOCUMENTS

| | | | |
|---|---|---|---|
| 2004/0202326 A1* | 10/2004 | Chen et al. | 380/263 |
| 2004/0252834 A1* | 12/2004 | Nishimura et al. | 380/201 |
| 2005/0097315 A1* | 5/2005 | Carmeli | 713/160 |
| 2005/0147040 A1* | 7/2005 | Vayanos et al. | 370/235 |
| 2005/0201554 A1* | 9/2005 | Kramer et al. | 380/28 |
| 2006/0005047 A1* | 1/2006 | Lekatsas et al. | 713/193 |
| 2006/0210065 A1* | 9/2006 | Ito et al. | 380/28 |
| 2006/0233366 A1* | 10/2006 | Takahashi | 380/201 |
| 2007/0081668 A1* | 4/2007 | McGrew et al. | 380/37 |
| 2008/0240424 A1* | 10/2008 | Park | 380/28 |
| 2009/0080572 A1* | 3/2009 | Choi et al. | 375/321 |
| 2009/0083783 A1* | 3/2009 | Park et al. | 725/25 |
| 2010/0158156 A1* | 6/2010 | Park et al. | 375/301 |
| 2010/0322424 A1* | 12/2010 | Choi et al. | 380/255 |
| 2011/0170687 A1* | 7/2011 | Hyodo et al. | 380/200 |
| 2011/0271298 A1* | 11/2011 | Park et al. | 725/31 |
| 2011/0276999 A1* | 11/2011 | Park et al. | 725/62 |

* cited by examiner

METHOD AND APPARATUS FOR USING COUNTER-MODE ENCRYPTION TO PROTECT IMAGE DATA IN FRAME BUFFER OF A VIDEO COMPRESSION SYSTEM

CROSS-REFERENCE TO RELATED APPLICATIONS/INCORPORATION BY REFERENCE

This application is a continuation of U.S. application Ser. No. 11/135,906 filed May 24, 2005, now U.S. Pat. No. 8,094,814, which application makes reference to, claims priority to, and claims the benefit of U.S. provisional patent application Ser. No. 60/668,395, filed Apr. 5, 2005.

Each of the above stated applications is hereby incorporated herein by reference in its entirety.

FIELD OF THE INVENTION

Certain embodiments of the invention relate to encryption of video data. More specifically, certain embodiments of the invention relate to a method and system for using counter-mode encryption to protect image data in a frame buffer of a video compression system.

BACKGROUND OF THE INVENTION

In some conventional video processing systems, video data such as movies are vulnerable to piracy and require protection against illegal copying. The loss associated with piracy and unauthorized copying is greatest in high value movies and video programs. Since uncompressed digital video in clear form can be used to create perfect copies of the high value programs in particular, it is necessary to enable the protection of uncompressed video with copy protection technology. To protect against piracy or unauthorized copying, video data such as high value video content is sometimes compressed and encrypted before it can be accessed in memory and storage devices. Video decoding and de-compression systems generally utilize frame buffers for motion prediction, which may provide enhanced picture quality. Video images or pictures stored in these frame buffers are un-compressed and clear. Accordingly, attackers or hackers may utilize various schemes to access these buffers and copy the video images.

Scramblers may be utilized to scramble uncompressed data to guard against unwanted intrusion by attackers or hackers. There may be several issues related to implementing scramblers for protecting video frame buffers. For example, scramblers may require a very high throughput. A resolution of 1920×1080 8-bit pixels and 30 frame/second with 4:2:0 chroma format video would require at least 746.496 Mbps and may be as high as 2.3 Gbps, for example. This may be very expensive to implement. If the scrambler is included in a DRAM controller, the initial latency of the DRAM controller may increase. This increase in initial latency may impact critical instantaneous bandwidth. If a block cipher is utilized directly, the block scrambling may increase the size of memory fetches needed to perform motion compensation (MC).

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for using counter-mode encryption to protect image data in a frame buffer of a video compression system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects for protecting image data in a video compression system may include encrypting image data utilizing counter-mode scrambling. The encrypted image data may be buffered in at least one frame buffer. The buffered encrypted image data may be decrypted by utilizing counter-mode descrambling.

Figure 1:
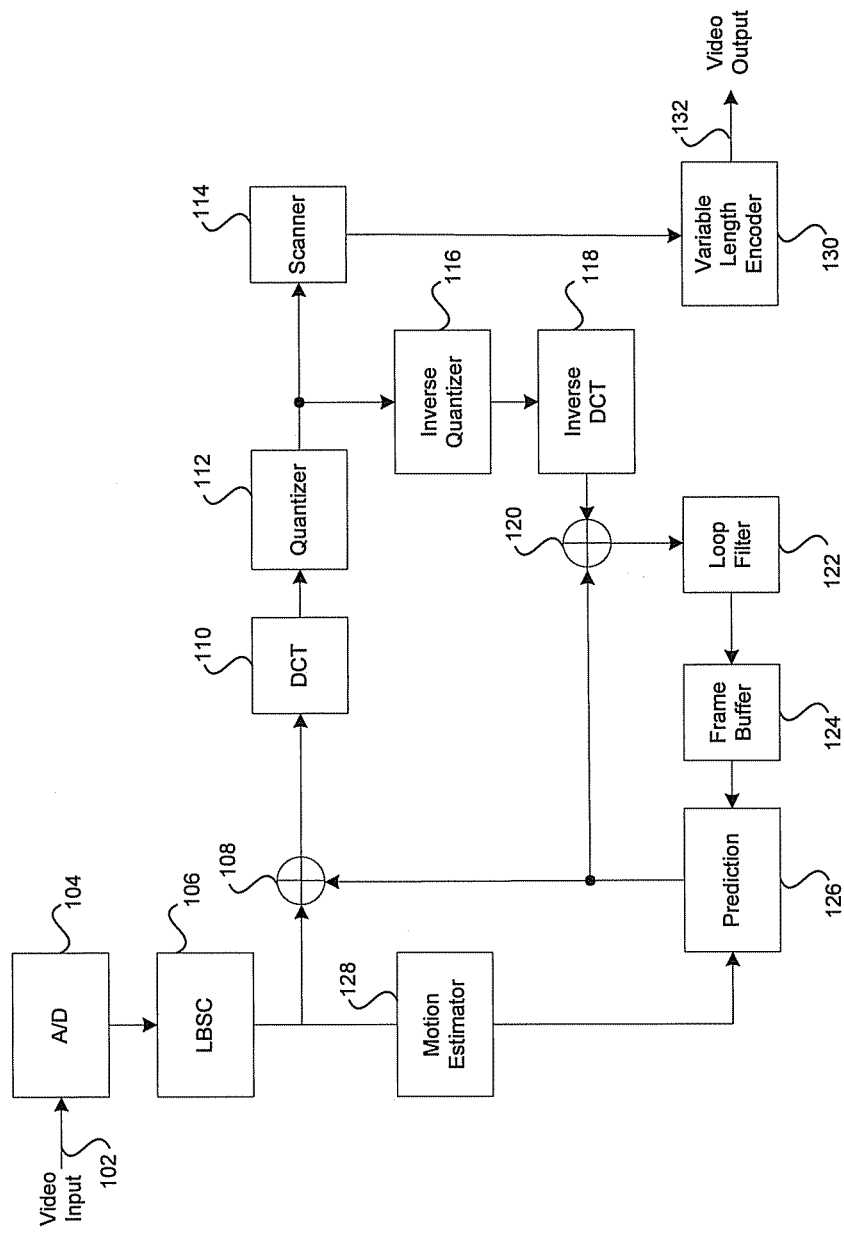
FIG. 1 is a block diagram of a system utilizing motion compensation with discrete cosine transform (DCT) that may be utilized in connection with an embodiment of the invention.

FIG. 1 is a block diagram of a system utilizing motion compensation with discrete cosine transform that may be utilized in connection with an embodiment of the invention. Referring to FIG. 1, there is shown an input video signal 102, an analog-to-digital (ND) converter 104, a line to block scanning converter (LBSC) block 106, comparator blocks 108, 120, a discrete cosine transform (DCT) block 110, a quantization block 112, a scanner block 114, an inverse quantization block 116, an inverse DCT block 118, a loop filter block 122, a frame buffer block 124, prediction block 126, a motion estimation block 128, variable length encoder block 130 and an output video signal 132.

The input video signal 102 may be converted from an analog format to a digitized format by the ND converter 104. The output digital signal produced by the ND converter may be sent to the line to block scanning converter (LBSC) block 106 for processing. The output signal from the LBSC block 106 may be processed by the motion estimation block 128. The output signal from the LBSC block 106 may also be transferred to the comparator block 108. The comparator block 108 may be adapted to compare the output signal from the LBSC block 106 and the prediction block 126 to discern the differences in the pictures being processed. A resultant output signal produced by the comparator block 108 may be transferred to the DCT block 110 for processing. The output of the DCT block 110 may be transferred to the quantization block 112 for processing. The output of the quantization block 112 may be scanned by the scanner block 114 and transferred to the variable length encoder block 130. The variable length encoder block 130 may be adapted to produce the resultant output video signal 132, which may be coupled to a channel or transferred to a storage device.

The output signal from the quantization block 112 may also be transferred to the inverse quantization block 116 for processing. The inverse DCT block 118 may be configured to perform an inverse DCT operation on a resulting output inverse quantized signal produced by the inverse quantization block 116. An output inverse DCT signal generated by the inverse DCT block 118 may be compared with the output signal produced by the prediction block 126. The signal resulting from the comparison of the output signal from inverse DCT block 118 and the output of the prediction block 126 may be loop filtered by the loop filter block 122. A resultant loop filtered signal may be buffered in frame buffer block 124. The pictures buffered in the frame buffer block 124 may be transferred to the prediction block 126 for processing.

FIG. 1 provides a comparison between a current picture and a previous picture. For example, an 8×8 pixel block for a previous picture may be compared with an 8×8 pixel block for a current picture. In this regard, the motion estimator block 128 may determine based on the comparison, those pixels in the pixel block of the current picture that exhibit motion. The motion compensation with DCT processing system operates by comparing, the input signal in units of blocks against a locally decoded copy of the previous picture. A resultant motion vector may be generated, extracted and utilized to calculate a difference between a previous and a current picture. The motion vector is extracted by, for example, shifting vertically or horizontally a selected segment or block of several pixels and performing matching within the block or a macro-block. For example, a 16×16 pixel block of a picture may be utilized.

The motion compensated picture difference signal may be transformed in order to remove or minimize any spatial redundancy that may exist. A variety of compression techniques may be applied in quantizing the transform coefficients. A commonly used method is zig-zag scan, which has been standardized in protocols such as H.261, H.263, MPEG-1, MPEG-2, and MPEG-4, which are utilized for video transmission encoding. The scanner block 114 may be adapted to perform zig-zag scan, which transforms 2-dimensional formatted data into one dimension formatted data. Linear quantization may be utilized as the DC component of the coefficients may be of critical importance. Other components may be scanned, for example, in a zig-zag fashion, from low frequency to high frequency, linearly quantized, and variable length encoded. The variable length encoder block 130 may utilize run length and entropy coding to variable length encode the output of the scanner block 114.

In ITU standards H.261 and H.263, ISO standards MPEG-1, MPEG-2 and MPEG-4 standards, a macro-block (MB) for the 4:2:0 video format results from combining four Y blocks with one block of the Cb-component and Cr-component. Three useful pictures coding types are I-pictures, P-pictures and B-pictures. I-pictures represent intra-frames, P-pictures represent uni-directional predicted pictures and B-pictures represent bidirectional predicted pictures. For I-picture encoding, each macro-block is intra-coded. For example, each block of 8×8 pixels in a macro-block is transformed into 64 coefficients by using DCT and then quantized. The quantization of DC coefficients differs from that of AC coefficients. Entropy encoding may be applied to the DC parameters and the AC parameters, resulting in a variable-length encoded word. For P-picture or B-picture encoding, the macro-blocks are either motion compensated with DCT transform coded or intra-coded. The prediction of the motion compensation with DCT transform coded macro-blocks is determined by a comparison of the macro-blocks from previous images and the current image. Subsequently, the components of the motion vector are entropy encoded by using a lossless variable-length coding system.

Figure 2A:
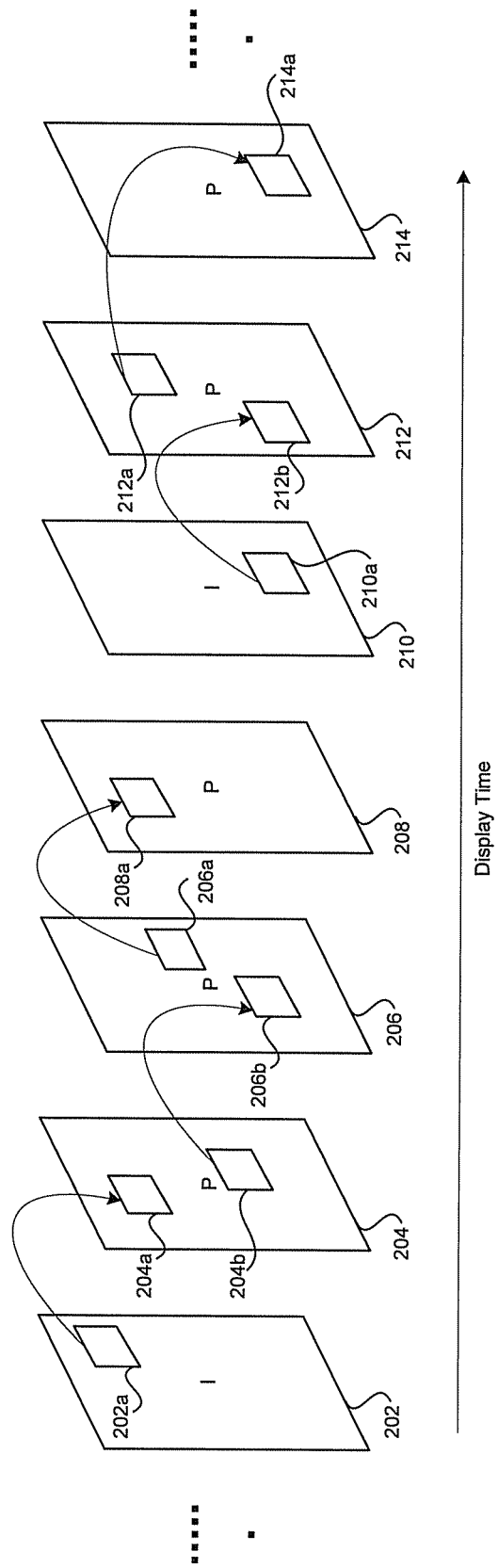
FIG. 2a is a diagram illustrating exemplary motion prediction for intra (I) frames and predictive (P) frames that may be utilized in connection with an embodiment of the invention.

FIG. 2a is a diagram illustrating exemplary motion prediction for intra (I) frames and predictive (P) frames that may be utilized in connection with an embodiment of the invention. Referring to FIG. 2a, there is shown I-frames 202 and 210 and P-frames 204, 206, 208, 212, 214. I-frame 202 includes a block 202a. The P-frame 204 is predicted from the I-frame 202 and includes blocks 204a and 204b. Accordingly, block 204a, is predicted from block 202a. The P-frame 206 is predicted from the P-frame 204 and includes blocks 206a and 206b. Accordingly, block 206b is predicted from block 204b. The P-frame 208 is predicted from the P-frame 206. Accordingly, block 208a is predicted from block 206a. I-frame 210 includes block 210a. The P-frame 212 is predicted from the I-frame 210 and includes blocks 212a and 212b. Accordingly, block 212b, is predicted from block 210a. The P-frame 214 is predicted from the P-frame 212 and includes block 214a. Accordingly, block 214a is predicted from block 212a.

Figure 2B:
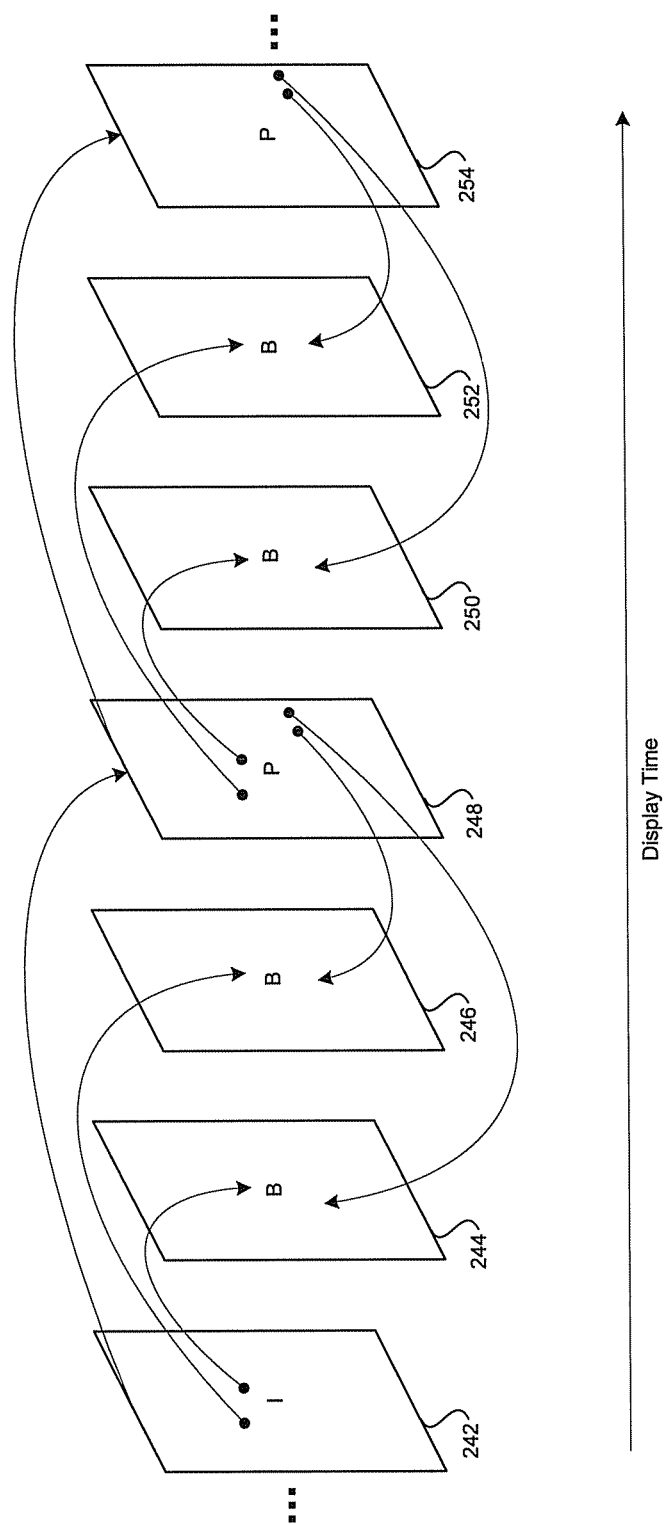
FIG. 2b is a diagram illustrating exemplary motion prediction for intra (I) frames, bidirectional (B) frames and predictive (P) frames that may be utilized in connection with an embodiment of the invention.

FIG. 2b is a diagram illustrating an exemplary motion prediction. Referring to FIG. 2b, there is shown I-picture 242, B-pictures 244, 246, 250, 252, and P-pictures 248, 254. The P-picture 248 is predicted from the I-picture 242 and the P-picture 254 is predicted from the P-picture 248. B-pictures 244, 246 are predicted from the I-picture 242. The B-pictures 244, 246 are predicted from the I-picture 242 and the B-pictures 250, 252 are predicted from P-picture 248. Since the B-pictures are bi-directional pictures, the B-pictures 244, 246 are predicted from the P-picture 248. Likewise, the B-pictures 250, 252 are predicted from the P-picture 254.

In general, the compression algorithm encodes some pictures in a video sequence as I-pictures. Other pictures are coded using Inter-picture prediction, e.g. P-pictures. Data from the previously coded I-picture or P-picture may be used for prediction. The algorithm processes the pictures of a video sequence in a block based manner. Each input color picture in a video sequence may be partitioned into non-overlapping macro-blocks.

Figure 3:
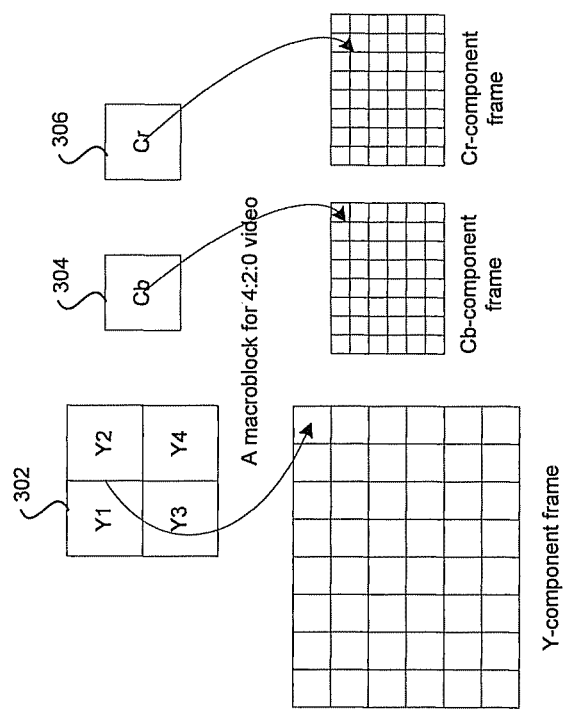
FIG. 3 is a diagram illustrating an exemplary partitioning of an input color picture into non-overlapping macro-blocks that may be utilized in connection with an embodiment of the invention.

FIG. 3 is a diagram illustrating an exemplary partitioning of an input color picture into non-overlapping macro-blocks that may be utilized in connection with an embodiment of the invention. Referring to FIG. 3, there is shown a macro-block for 4:2:0 video. The macro-block includes a luminance component 302, chrominance Cb component 304 and chrominance Cr component 306. The luminance component 302 is mapped to the Y-component frame. The Cb-component 304 is mapped to the Cb-component frame and the Cr-component 306 is mapped to the Cr-component frame. In general, each macro-block contains blocks of data from both luminance and co-sited chrominance bands, namely, four luminance blocks (Y1, Y2, Y3, Y4) and two chrominance blocks (Cb, Cr), each with size 8×8 pixel elements (pels). Thus the sampling ratio between Y:Cb:Cr luminance and chrominance pixels is 4:1:1.

P-pictures are coded using motion compensated prediction based on a previous picture. Each picture may be divided into disjoint macro-blocks, each of which may contain 8×8 pels. For each of the macro-blocks, information related to four luminance blocks (Y1, Y2, Y3, Y4) and two chrominance blocks (Cb, Cr) may be coded. B-pictures may be coded using motion compensated prediction based on the two nearest already coded pictures, which are either an I-picture or a P-picture. The direction of prediction for a B-picture is illustrated in FIG. 2b.

When compared to MPEG-1 and MPEG-2, the MPEG-4 part-2 video standard differs in that a scene, which is to be coded may be treated as having individual objects. Accordingly, each object in the scene can be coded individually and the decoded objects can be composed in a scene. In MPEG-4 part-2 video, a video object plane (VOP) may be described by texture variations such as a set of luminance and chrominance values and/or by explicit or implicit shape representations. In natural scenes, for example, VOPs may be obtained by semi-automatic or automatic segmentation, and the resulting shape information may be represented as a binary shape mask. On the other hand, for natural and synthetic hybrid scenes, for example, VOPs may be generated by blue screen composition, while shape information may be represented by an 8-bit component. The 8-bit component may be referred to as gray scale shape. Video objects (VOs) may also be subdivided into multiple representations or video object layers (VOLs), allowing scalable representations of the video object. In cases where an entire scene may be considered as one object and all VOPs are rectangular and of the same size as each picture, then a VOP may be characterized as being identical to a picture. Additionally, an optional group of video object planes (GOV) may be added to the video coding structure to assist in random access operations.

Figure 4:
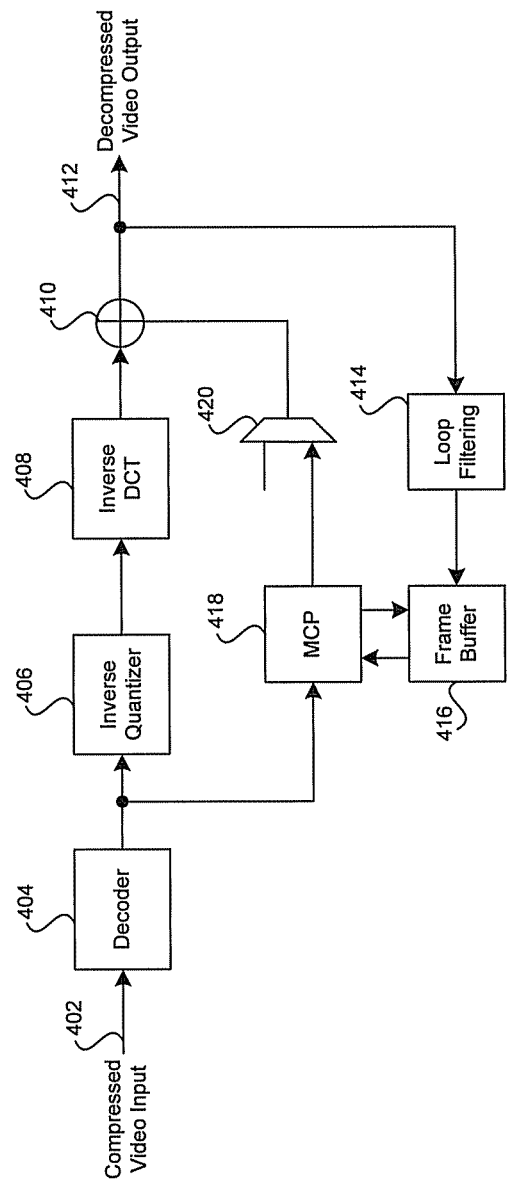
FIG. 4 is a block diagram illustrating an exemplary digital video decompressor that may be utilized in connection with an embodiment of the invention.

FIG. 4 is a block diagram illustrating an exemplary digital video decompressor that may be utilized in connection with an embodiment of the invention. Referring to FIG. 4, there is shown a decoder block 404, and inverse quantizer block 406, an inverse DCT block 408, a comparator block 410, a loop filtering block 414, a frame buffer block 416, a motion compensated predictor block (MCP) 418 and a selector 420. The input signal 402 to the decoder block 404 is a compressed video signal. The decoder block 404 may be an entropy decoder block. Decompressed video output signal 412 is the output signal generated by the digital video decompressor.

The decoder block 404 may be adapted to extract and decode the variable length coded words in the compressed video input signal 402. The resulting output signal generated by the decoder block 404 comprises motion vectors and quantizer values for the non-zero transform coefficients. The output of the decoder block 404 may be transferred to the inverse quantizer block 406 where the decoded quantizer values may be processed. A resultant output signal from the inverse quantizer block 406 may be transferred to the inverse DCT block 408 for processing.

The motion vectors generated by the decoder block 404 may be processed by the motion compensated predictor block 418. The selector 420 may be configured to transfer the output of the motion compensated predictor block 418 to the comparator block 410. Alternatively, the output of the motion compensated predictor block 418 may be buffered in the frame buffer block 416. Accordingly, the comparator block 410 may be adapted to compare a current and a previous picture. The decompressed video output signal 412 may be generated by the comparator block 410. Notwithstanding, an output signal from the comparator block 410 may be transferred to the loop filtering block 414 for processing. The output of the loop filtering block 414 may be buffered in the buffer block 416, from which it may be transferred to the motion compensated predictor block 418 for processing.

In operation, with the reconstruction of all non-zero transform coefficients belonging to one block and their subsequent inverse transform, a quantized block of pixel values may be obtained. The motion compensated pixels from the previous decoded pictures, which may be stored in the frame buffers, may be added to the prediction error to recover the particular macro-block. By processing an entire compressed video bitstream, all picture blocks in the bitstream may be decoded and reconstructed. The frame buffers used for motion prediction during video de-compression systems comprise clear uncompressed images and picture information. As a result, the information stored in these frame buffers are readily accessible and may easily be copied or otherwise compromised.

Figure 5:
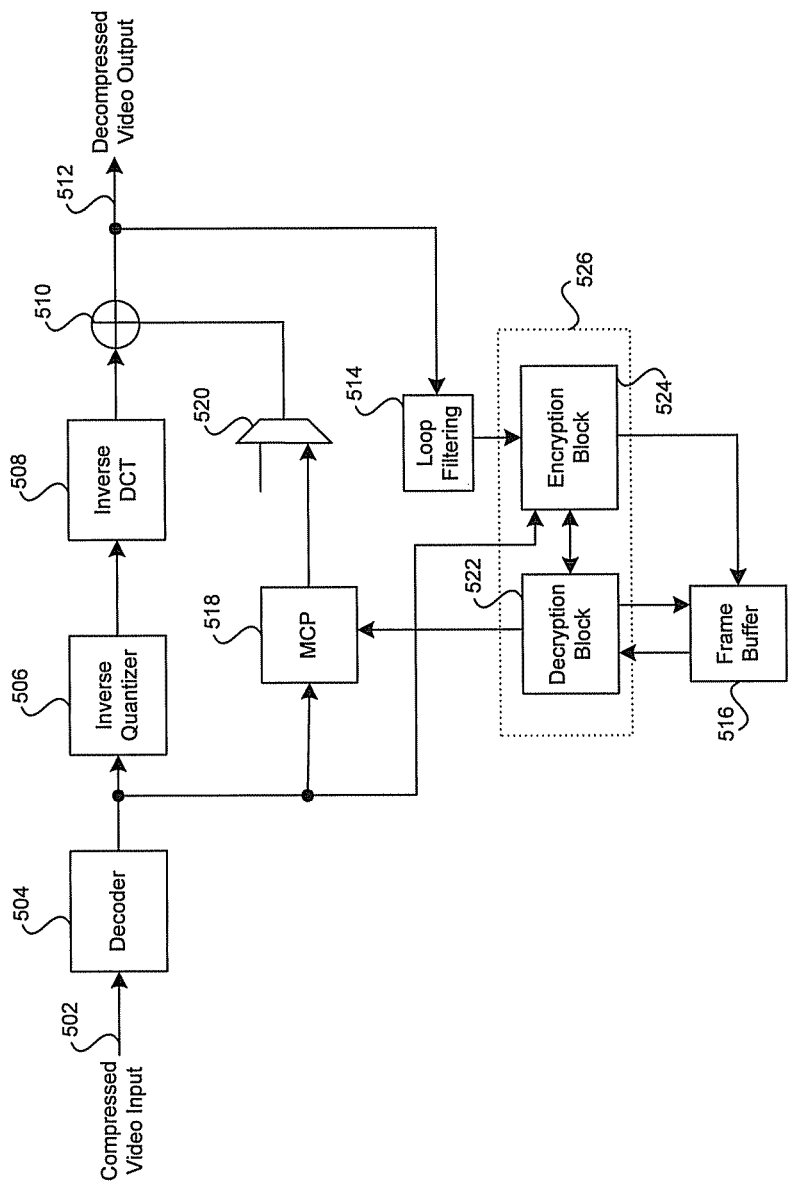
FIG. 5 is a block diagram illustrating an exemplary digital video decompressor with frame buffer copy protection that may be utilized in connection with an embodiment of the invention.

FIG. 5 is a block diagram illustrating an exemplary digital video decompressor with frame buffer copy protection that may be utilized in connection with an embodiment of the invention. Referring to FIG. 5, there is shown a decoder block 504, an inverse quantizer block 506, an inverse DCT block 508, a comparator block 510, a loop filtering block 514, a frame buffer block 516, a motion compensated predictor block (MCP) 518, a selector block 520 and a protection block 526. The protection block 526 may include an encryption block 524 and a decryption block 522. An input signal 502 to the decoder block 504 is a compressed video signal. The decoder block 504 may be an entropy decoder block. An output signal 512 from the comparator block 510 is a decompressed video output signal generated by the digital video decompressor.

The frame buffers in the frame buffer block 516 may be utilized for storing or buffering image data, which may be utilized for motion prediction during video de-compression. Prior to storing image data in the frame buffer block 516, the image data may be encrypted by the encryption block 522. Accordingly, clear image data and picture information may not be stored in the frame buffer block 516. As a result, the information stored in these frame buffers is not readily accessible and may not be easily copied or otherwise compromised.

The decoder block 504 may be configured to extract the variable length coded words in the bitstream for the compressed video input signal 502. Subsequent to extracting the variable length coded words, the decoder block 504 may decode the extracted variable length coded words. The resulting output signal generated by the decoder block 504 while it is decoding the variable length coded words, may include motion vectors and quantizer values for the non-zero transform coefficients. The output of the decoder block 504 may be transferred to the inverse quantizer block 506 where the decoded and quantized values may be processed. A resultant output signal from the inverse quantizer block 506 may be transferred to the inverse DCT block 508 for processing.

The motion vectors generated by the decoder block 504 may be processed by the motion compensated predictor block 518. The selector 520 may be configured to transfer the output of the motion compensated predictor block 518 to the comparator block 510. In this manner, a motion compensated error for a previously quantized macro-block pixel value may be added to a prediction error to more efficiently recover current and subsequent macro-blocks. Alternatively, the selector block 520 may be configured to prevent the output of the motion compensated predictor block 518 from being processed by the comparator block 510. Notwithstanding, the output of the decoder block 504 may be encrypted by the encryption block 524. The encrypted output from the encryption block 524 may be buffered in the frame buffer block 516. The encrypted image data in the frame buffer block 516 may be transferred to the decryption block 522 where it may be decrypted and then transferred to the motion compensated predictor block 518 for processing. At least one data line and at least one address line may be utilized to transfer data from the frame buffer block 516 for processing by the decryption block 522.

Notwithstanding, the comparator block 510 may be adapted to compare a current and a previous macro-block, in order to determine for example, a prediction error. The output signal 512 produced by the video decompressor may be generated by the comparator block 510 and may include decompressed pictures. Notwithstanding, an output signal from the comparator block 510 may be transferred to the loop filtering block 514 for processing, which may include loop filtering. The output signal generated by the loop filtering block 514 may be buffered in the frame buffer block 516, from which it may be transferred to the motion compensated predictor block 518 for processing.

In operation, the quantized macro-block of pixel values may be obtained by reconstructing the non-zero transform coefficients corresponding to a particular macro-block. Furthermore, the reconstructed non-zero transform coefficients may be inversely DCT transformed by the inverse DCT block 508. The motion compensated pixels derived from previously decoded pictures that are stored in the frame buffer block 516, may be added to the prediction error to more accurately recover a particular macro-block. By processing the entire bit stream, all picture blocks may be decoded and reconstructed.

In another embodiment of the invention, the image data or information stored in the frame buffer block may be scrambled to further enhance data security of the video decompressor. One or more reference frames in the image data may be stored in a scrambled manner within the frame buffer block 516. In this regard, to further enhance data security, encrypted video data located in the frame buffers block 516 may be dynamically remapped so that the location of the pixel block in the frame buffer is unpredictable.

Figure 6:
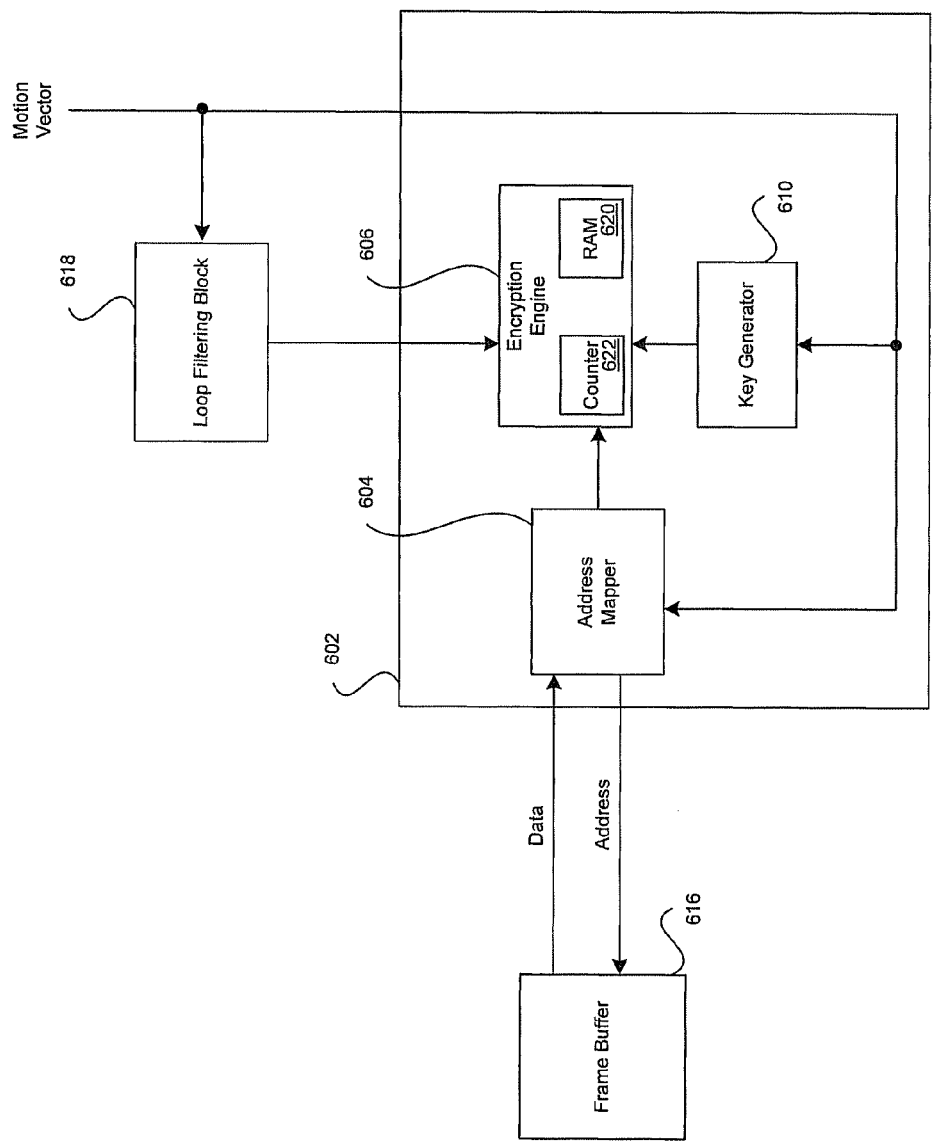
FIG. 6 is a block diagram of an exemplary encryption block as illustrated in FIG. 5 that may be utilized in connection with an embodiment of the invention.

FIG. 6 is a block diagram of an exemplary encryption block as illustrated in FIG. 5 that may be utilized in connection with an embodiment of the invention. Referring to FIG. 6, there is shown an encryption block 602, a frame buffer block 616 and a loop filtering block 618. The encryption block 602 may include an address mapper 604, an encryption engine 606 and a key generator 610. The encryption engine 606 may comprise an internal random access memory (RAM) 620 and a counter mode scrambler counter 622. The key generator 610 may be adapted to generate one or more keys that may be utilized to encrypt and/or decrypt image data stored in the frame buffer block 616. The encryption engine 606, may be a data encryption standard (DES) engine, for example, and may be adapted to encrypt image data prior to storing the image data in the frame buffer block 616. The encryption engine 606 may also be adapted to scramble input image data so as to securely protect information. The address mapper 604 may be configured to re-map frame buffer addresses.

The encryption engine 606 may be adapted to encrypt image data utilizing counter-mode scrambling. The frame buffer 616 may be adapted to buffer the encrypted image data. The encryption engine 606 may be adapted to initialize the counter-mode scrambler counter 622. The encryption engine 606 may be adapted to load an encryption key generated by the key generator 610 to perform the counter-mode scrambling. The encryption engine 606 may be adapted to calculate a row size of an encryption cipher to perform the counter-mode scrambling. The encryption engine 606 may be adapted to generate a pad $E_K(ctr)\|E_K(ctr+1)\|E_K(ctr+2)\| \ldots \|E_K(ctr+m)$, where m is an integer of the encryption cipher utilizing the calculated row size. To encrypt using counter-mode scrambling, a plaintext string M, a key K and a counter ctr may be utilized by the encryption engine 606. The plaintext M may be an arbitrary bit string. The counter ctr may be an n-bit string.

The encryption engine 606 may be adapted to store the encrypted image data along with its corresponding horizontal pixel address in an internal random access memory (RAM) 620. The encryption engine 606 may be adapted to arrange the buffered encrypted image data in raster scan order. The encryption engine 606 may be adapted to generate the encrypted image data by exclusive-oring (XORing) at least one plaintext string M of the image data and first |M| bits of a generated pad $E_K(ctr)\|E_K(ctr+1)\|E_K(ctr+2)\| \ldots \|E_K(ctr+m)$, where m is an integer. The encryption engine 606 may be adapted to pre-process the generated pad $E_K(ctr)\|E_K(ctr+1)\|E_K(ctr+2)\| \ldots \|E_K(ctr+m)$, where m is an integer in spare cycles to improve efficiency.

Figure 7:
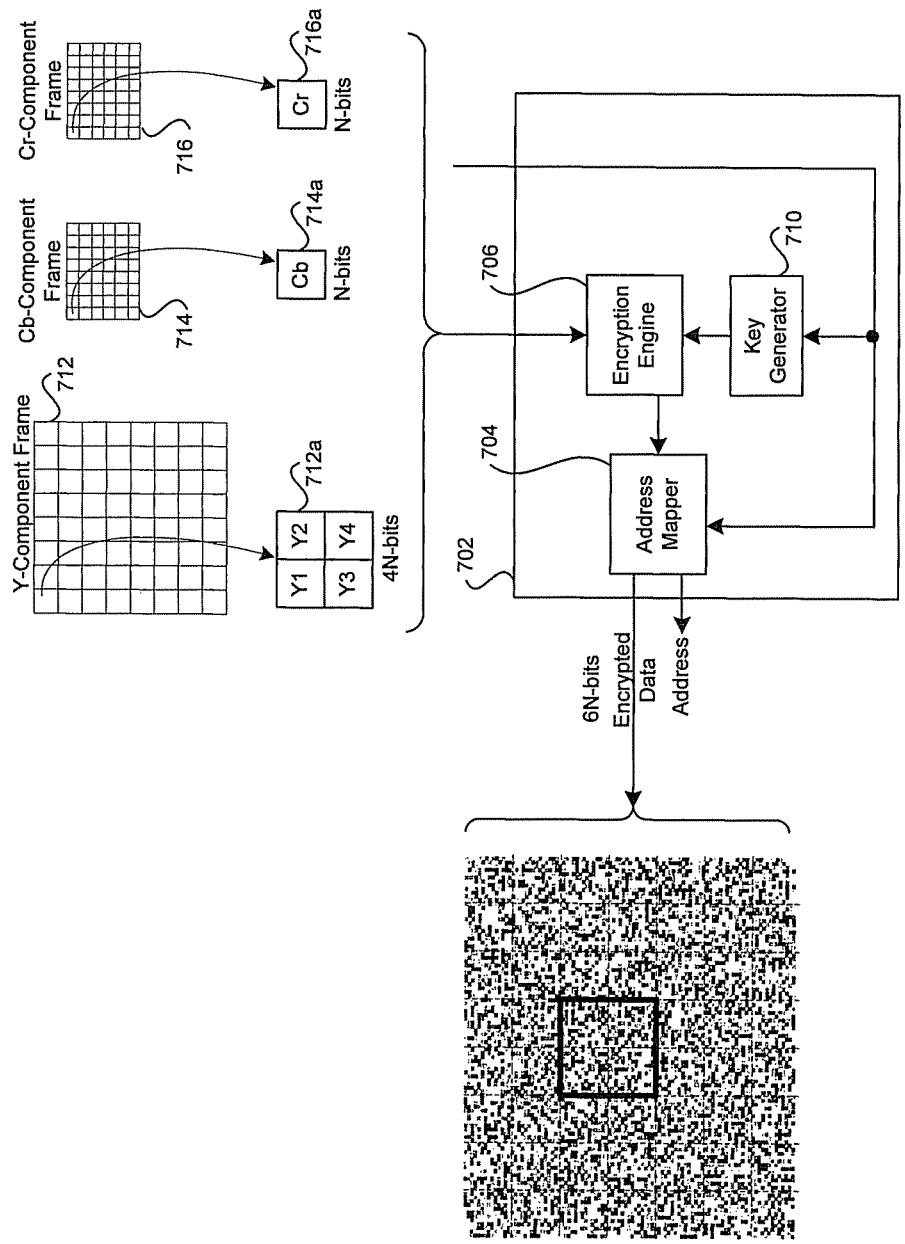
FIG. 7 is a block diagram illustrating an exemplary frame buffer encryption that may be utilized in connection with an embodiment of the invention.

FIG. 7 is a block diagram illustrating an exemplary frame buffer encryption that may be utilized in connection with an embodiment of the invention. Referring to FIG. 7, there is shown an encryption block 702, a frame buffer block 716 and a loop filtering block 718. The encryption block 702 may include an address mapper 704, an encryption engine 706 and a key generator 710. The encryption block 702 is similar to the encryption block 602 of FIG. 6. FIG. 7 also includes a Y-component frame 712, a Cb-component frame 714 and a Cr-component frame 716. For illustrative purposes, a 4:2:0 formatted video is utilized. However, the invention is not limited in this regard.

For illustrative purposes, the Y-component of a frame may be partitioned into 2M×2M pixel blocks. The Cb-component and the Cr-component of a frame may be partitioned into M×M pixel blocks. For 8-bit video in 4:2:0 format, for example, M×M pixels have N=M×M×8 bits. Each 2M×2M pixel of the Y-component block and its corresponding M×M pixel Cb-block and Cr-block may be grouped together and sent to the encryption engine 706 for processing. For example, Y-component block 712*a*, and its corresponding M×M pixel Cb-block 714*a* and Cr-block 716*a* are grouped and encrypted by the encryption engine 706. The key generator 710 may utilize, for example, the block address to generate a key for encrypting each grouped Y-component block 712*a*, and its corresponding M×M pixel Cb-block 714*a* and Cr-block 716*a*. The encryption or DES engine 706 may scramble the image data stored in the frame buffer block. To further secure image data in the frame buffer block, at least some of the keys utilized for scrambling image data stored in the frame buffer block may be address dependent. The address mapper 704 may be adapted to re-map the block address to the frame buffer address. The resulting encrypted image data may be stored in the frame buffer based on the re-mapped address.

Figure 8:
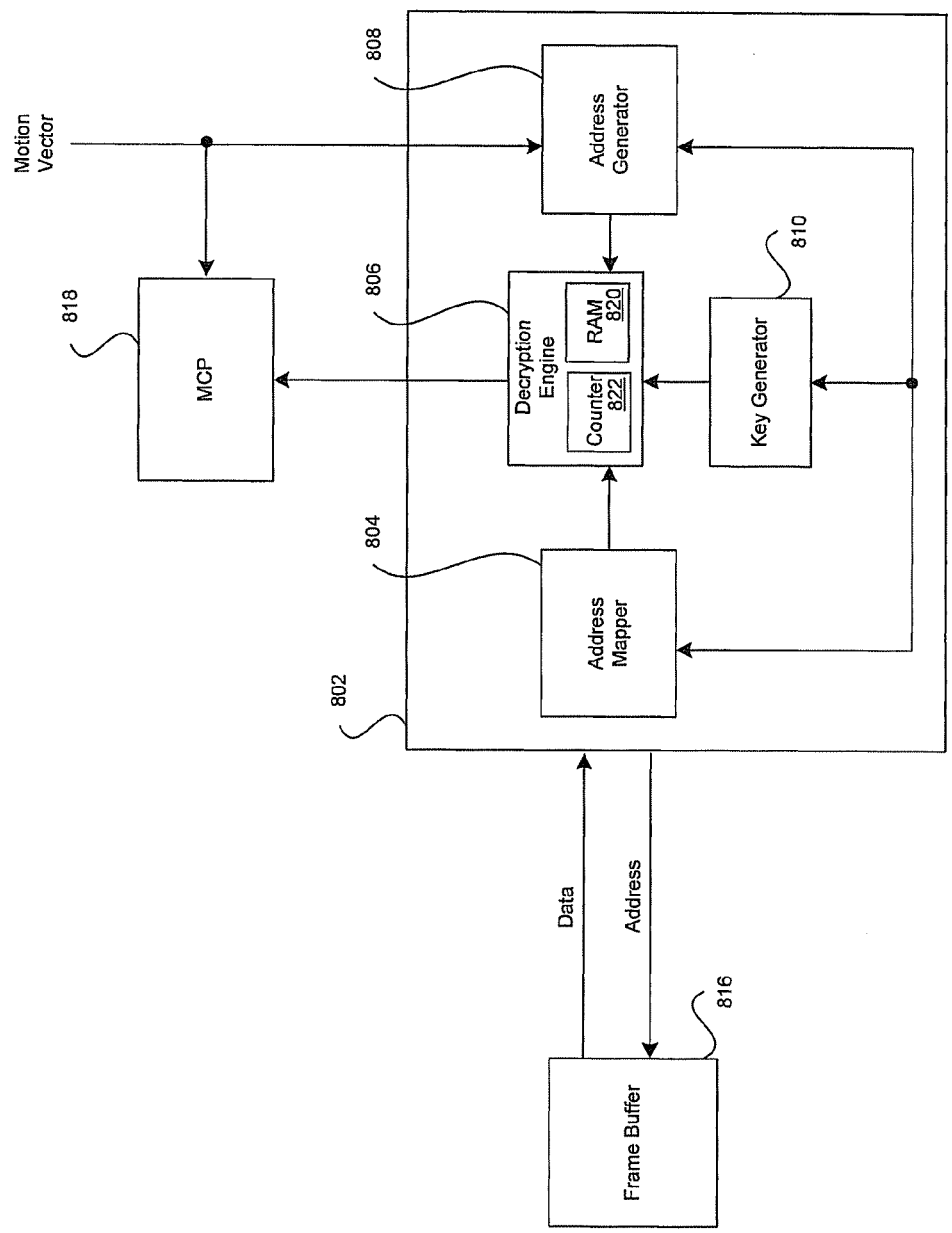
FIG. 8 is a block diagram of an exemplary frame buffer decryption block as illustrated in FIG. 5 that may be utilized in connection with an embodiment of the invention.

FIG. 8 is a block diagram of an exemplary frame buffer decryption block as illustrated in FIG. 5 that may be utilized in connection with an embodiment of the invention. Referring to FIG. 8, there is shown a decryption block 802, a MCP block 818 and a frame buffer block 816. The decryption block 802 may include an address mapper 804, a decryption engine 806, an address generator block 808 and a key generator block 810. The decryption engine 806 may comprise an internal random access memory (RAM) 820 and a counter-mode descrambler counter 822.

The address mapper 804 retrieves or receives a block address and maps the block address into a corresponding frame buffer address. The decryption engine 806 may be a DES engine, for example, and may be adapted to decrypt image data that has been transferred from the frame buffer block 816. The address generator block 808 may be adapted to generate block addresses based on, for example, a motion vector.

In operation, the address generator 808 may receive motion vectors and utilize the received motion vectors to compute or generate a block address. The address mapper 804 may map the generated block address to a corresponding frame address, which may be utilized for fetching encrypted image data. The key generator 810 may generate one or more decryption keys, which may be utilized by the decryption or DES engine to decrypt the encrypted image data identified by the frame buffer address. The encryption or DES engine 806 may decrypt the image data using the key generated by the key generator 810. The resulting decrypted image data may be sent to the motion compensated predictor block 818 for processing.

In one aspect of the invention, the address mapper 704 (FIG. 7) in the encryption block 702 and the address mapper 804 in the decryption block 802 may be operated in a synchronous manner. Synchronous operation may ensure that the address mapping or remapping may change from picture frame to picture frame and/or between groups of pictures (GOPs), for example. During motion prediction of each motion compensated block, multiple surrounding blocks may be fetched for decryption. However, the invention is not limited in this regard. In certain video compression standards, for example, MPEG-2 main profile (MP), MPEG-4 advanced simple profile (ASP) and MPEG-4 advanced video coding (AVC (H.264)), the block sizes for motion compensation may be different. Accordingly, the block size utilized for encrypting frame buffers may also be different.

The frame buffer 816 may be adapted to buffer the encrypted image data. The decryption engine 806 may be adapted to decrypt buffered encrypted image data utilizing counter-mode descrambling. The decryption engine 806 may be adapted to initialize a counter-mode descrambler counter 822. The decryption engine 806 may be adapted to load a decryption key generated by the key generator 810 to perform the counter-mode descrambling. The decryption engine 806 may be adapted to calculate a row size of a decryption cipher to perform the counter-mode descrambling. The decryption engine 806 may be adapted to generate a pad $E_K(ctr)\|E_K(ctr+1)\|E_K(ctr+2)\| \ldots \|E_K(ctr+m)$, where m is an integer of the decryption cipher utilizing the calculated row size.

The decryption engine 806 may be adapted to store the encrypted image data along with its corresponding horizontal pixel address in an internal random access memory (RAM) 820. The decryption engine 806 may be adapted to arrange the buffered encrypted image data in raster scan order. The decryption engine 806 may be adapted to generate the decrypted buffered encrypted image data by exclusive-oring (XORing) at least one ciphertext string C of the encrypted image data and first |C| bits of a generated pad $E_K(ctr)\|E_K(ctr+1)\|E_K(ctr+2)\| \ldots \|E_K(ctr+m)$, where m is an integer. The decryption engine 806 may be adapted to pre-process the generated pad $E_K(ctr)\|E_K(ctr+1)\|E_K(ctr+2)\| \ldots \|E_K(ctr+m)$, where m is an integer in spare cycles to improve efficiency.

Figure 9:
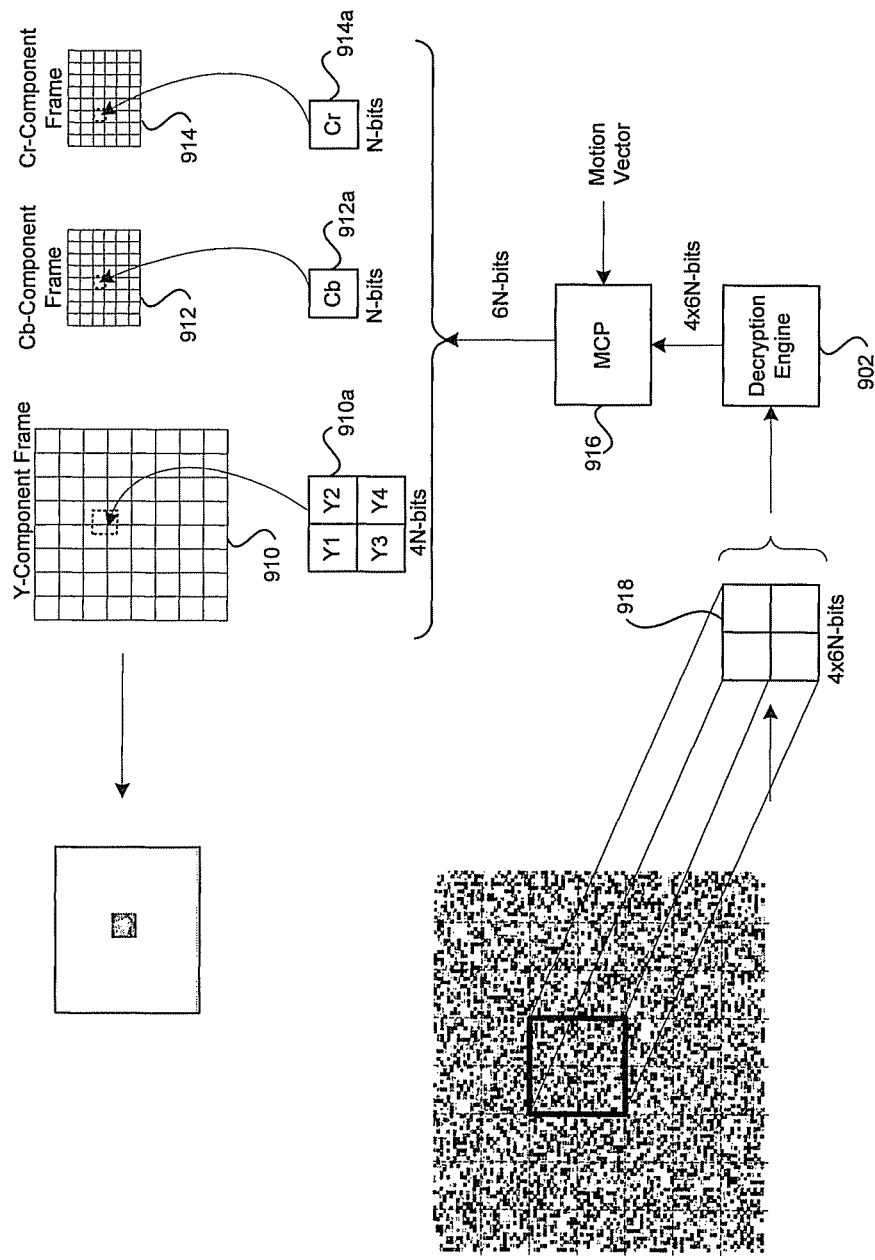
FIG. 9 is a block diagram illustrating an exemplary frame buffer decryption as illustrated in FIG. 5 that may be utilized in connection with an embodiment of the invention.

FIG. 9 is a block diagram illustrating an exemplary frame buffer decryption as illustrated in FIG. 5 that may be utilized in connection with an embodiment of the invention. Referring to FIG. 9, there is shown a decryption block 902, a motion compensated prediction block 916, a Y-component frame 910, a Cb-component frame 912 and a Cr-component frame 914.

In operation a 4×6 N-bit block may be retrieved from the frame buffer block for decryption by the decryption block 902. The resulting 4×6N-bits decrypted by the decryption block 902 may be processed by the motion compensated predictor block 916. The output of the motion compensated predictor block 916 includes the corresponding 6N-bits previously encrypted. This includes, the 4N-bits Y-component block 910a, the N-bit Cb-component block 912a and the N-bit Cr-component block 914a.

In one embodiment of the invention, counter-mode encryption may be utilized to protect image data in the frame buffer of a video compression system. The counter-mode encryption disclosed herein may be utilized in digital video de-compression systems, for example, MPEG-2 or MPEG-4 video decompression systems and transcoding systems. Counter-mode scrambling has significant advantages over other scrambling modes without weakening the security of the video decompression system.

Figure 10:
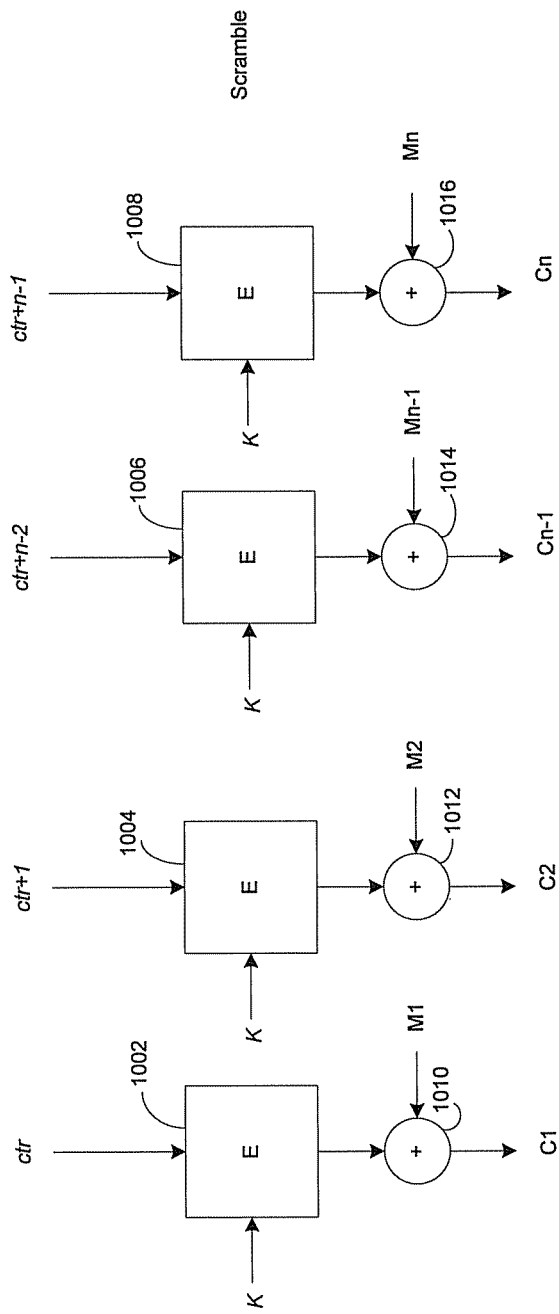
FIG. 10 is a diagram illustrating counter-mode scrambling, in accordance with an embodiment of the invention.

FIG. 10 is a diagram illustrating counter-mode scrambling, in accordance with an embodiment of the invention. Referring to FIG. 10, there is shown a plurality of cipher blocks 1002, 1004, 1006 and 1008 and a plurality of XOR blocks 1010, 1012, 1014 and 1016. The plurality of cipher blocks 1002, 1004, 1006 and 1008 may comprise suitable logic, circuitry and/or code that may be adapted to incorporate a function $E_K(X)$ to denote the encipherment of an n-bit block X using key K and a block cipher E. For example, the block cipher E may incorporate advanced encryption standard (AES), where n=128, for example. If X is a nonempty string and i is a nonnegative integer, then X+i may denote the |X|-bit string by considering X as a nonnegative number that may be written in binary, with the most significant bit first. By adding i to this number and calculating the result modulo $2^{|X|}$, the result may be converted back into a |X|-bit string. The plurality of XOR blocks 1010, 1012, 1014 and 1016 may comprise suitable logic, circuitry and/or code that may be adapted to XOR the inputs plaintext strings $M_{1 \ldots n}$ with their corresponding outputs of the cipher blocks 1002, 1004, 1006 and 1008 and generate a plurality of outputs of scrambled ciphertext $C_{1 \ldots n}$.

To encrypt using counter-mode scrambling, a plaintext string M, a key K and a counter ctr may be utilized. The plaintext M may be an arbitrary bit string. The counter ctr may be an n-bit string. Let C be the exclusive-or (XOR) of the plaintext string M and the first |M| bits of a pad $E_K(ctr)\|E_K(ctr+1)\|E_K(ctr+2)\| \ldots \|E_K(ctr+m)$, where m is an integer. The ciphertext may be a function of ctr and C, for example. To decrypt the ciphertext, the plaintext string M may be XORed with C and the first |C| bits of the pad $E_K(ctr)\|E_K(ctr+1)\|E_K$ (ctr+2)∥ . . . ∥$E_K$(ctr+m), where m is an integer. The process of descrambling may be similar to scrambling with M and C interchanged.

Figure 11:
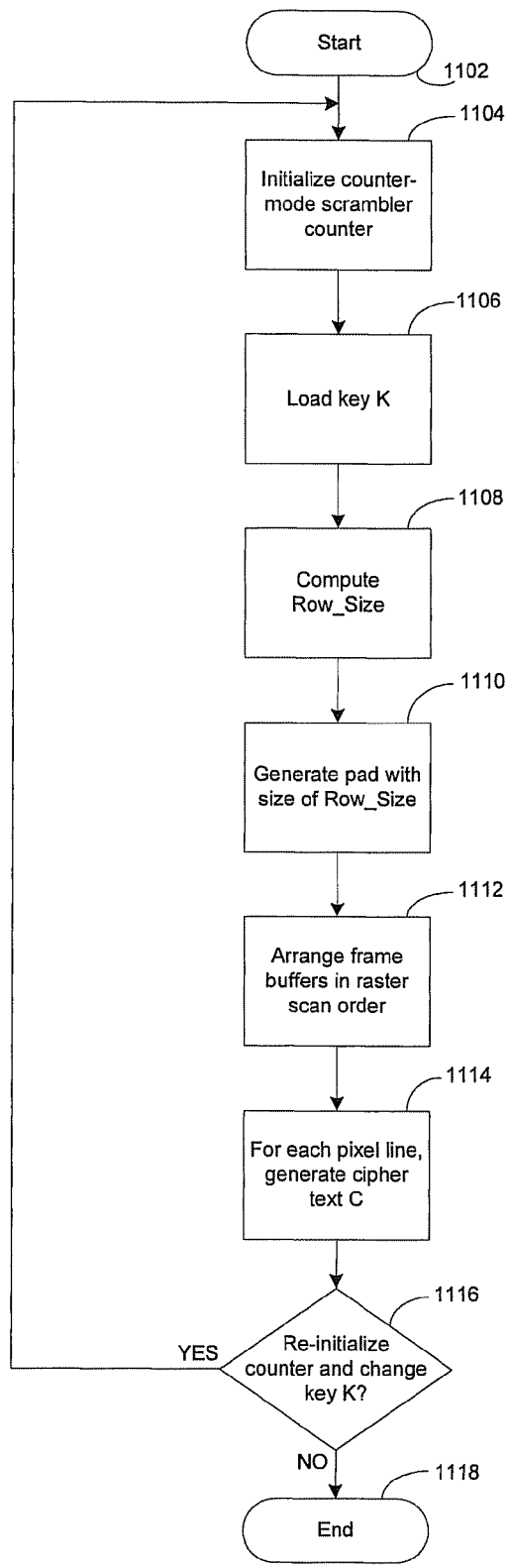
FIG. 11 is a flowchart illustrating counter-mode scrambling to protect image data in frame buffers of a video compression system, in accordance with an embodiment of the invention.

FIG. 11 is a flowchart illustrating exemplary steps for counter-mode scrambling to protect image data in frame buffers of a video compression system, in accordance with an embodiment of the invention. Referring to FIG. 11, the exemplary steps may start at step 1102. In step 1104, the counter-mode scrambler counter ctr may be initialized. For example, the counter-mode scrambler counter ctr may be initialized as an AES128 bit counter. The counter-mode scrambler counter may be pixel-addressable. In step 1106, the key K may be loaded into the scrambler. In step 1108, the row size may be calculated by utilizing the following expression:

$$ROW\_SIZE = \left[\frac{frame\_horizontal\_size \times \eta \times bit\_precision + n}{n}\right] \times n$$

where η=1.5 for chroma with 4:2:0 video, η=2 for chroma with 4:2:2 video, and η=3 for chroma with 4:4:4 video, bit_precision=8 for 8-bit video, for example, and n is the size of the block cipher, for example, for the block cipher with AES128, n=128. Notwithstanding, in accordance with an embodiment of the invention, a multiple or sub-multiple of the row size may be utilized.

In step 1110, the pad $E_K$(ctr)∥$E_K$(ctr+1)∥$E_K$(ctr+2)∥ . . . ∥$E_K$(ctr+m), where m is an integer may be generated with the size of ROW_SIZE. The scrambled data along with its corresponding horizontal pixel address may be stored in an internal secure RAM. In step 1112, the frame buffers may be arranged in raster scan or line order with interleaved YCbCr for each pixel. Notwithstanding, in accordance with an embodiment of the invention, any combination of a plurality of lines, such as arranging every two or three lines in raster scan order may be utilized. Each line of decoded pixels M is the plaintext. In step 1114, for each pixel line, the ciphertext C may be generated by XORing the plaintext string M and the first |M| bits of the pad $E_K$(ctr)∥$E_K$(ctr+1)∥$E_K$(ctr+2)∥ . . . ∥$E_K$(ctr+m), where m is an integer.

In step 1116, it may be determined whether the counter-mode scrambler counter ctr and key K needs to be initialized. If the counter-mode scrambler counter ctr and key K needs to be initialized, control passes to step 1104. If the counter-mode scrambler counter ctr and key K are not initialized, control passes to end step 1118.

Figure 12:
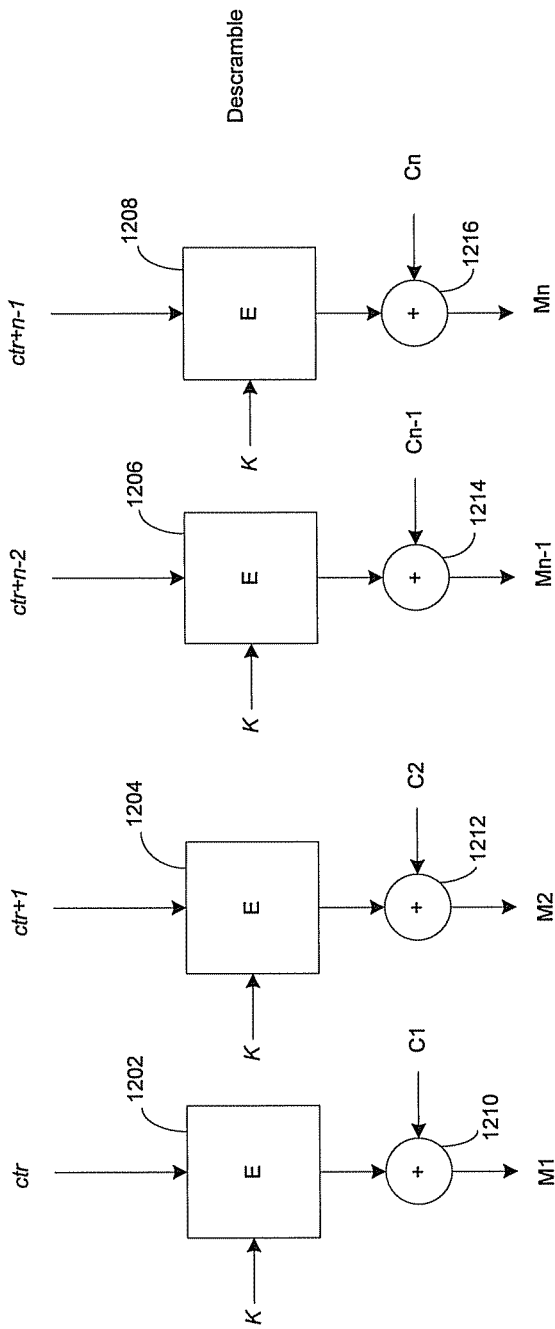
FIG. 12 is a diagram illustrating counter-mode descrambling, in accordance with an embodiment of the invention.

FIG. 12 is a diagram illustrating counter-mode descrambling, in accordance with an embodiment of the invention. Referring to FIG. 12, there is shown a plurality of cipher blocks 1202, 1204, 1206 and 1208 and a plurality of XOR blocks 1210, 1212, 1214 and 1216. The plurality of cipher blocks 1202, 1204, 1206 and 1208 may comprise suitable logic, circuitry and/or code that may be adapted to incorporate a function $E_K$(X) to denote the encipherment of an n-bit block X using key K and a block cipher E. For example, the block cipher E may incorporate advanced encryption standard (AES), where n=128, for example. The plurality of XOR blocks 1210, 1212, 1214 and 1216 may comprise suitable logic, circuitry and/or code that may be adapted to XOR the inputs ciphertext strings $C_{1 \ldots n}$ with their corresponding outputs of the cipher blocks 1202, 1204, 1206 and 1208 and generate a plurality of outputs of descrambled plaintext $M_{1 \ldots n}$.

Figure 13:
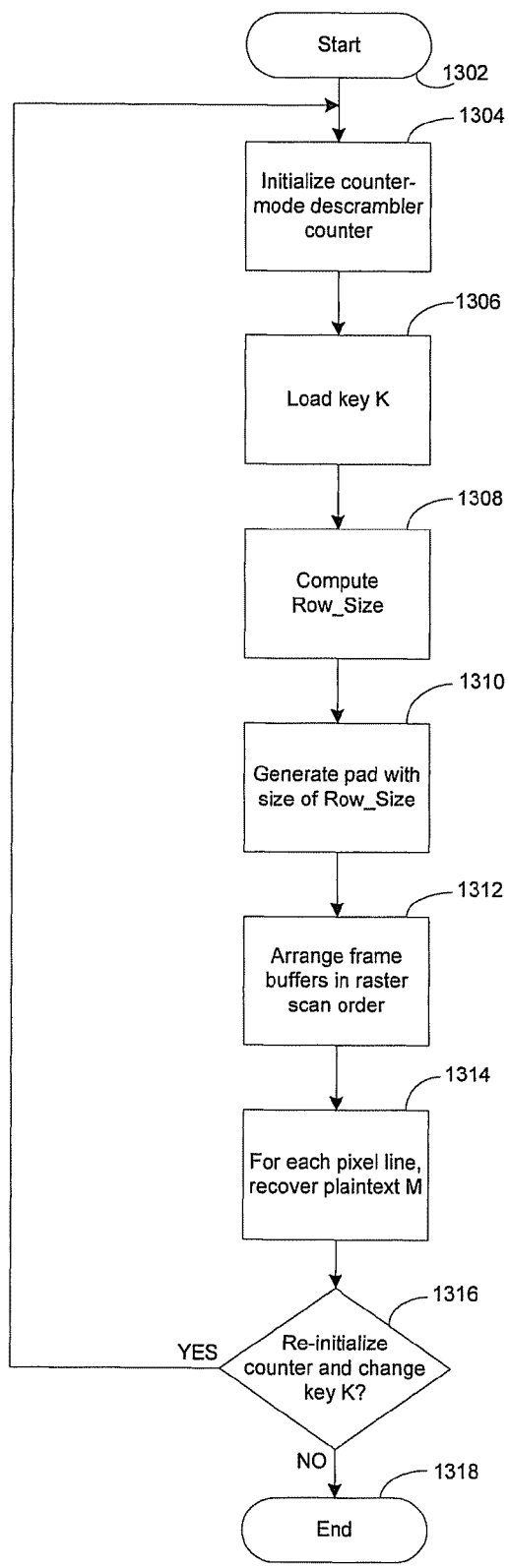
FIG. 13 is a flowchart illustrating exemplary steps for counter-mode descrambling to retrieve protected image data in frame buffers of a video compression system, in accordance with an embodiment of the invention.

FIG. 13 is a flowchart illustrating exemplary steps for counter-mode descrambling to retrieve protected image data in frame buffers of a video compression system, in accordance with an embodiment of the invention. Referring to FIG. 13, the exemplary steps may start at step 1302. In step 1304, the counter-mode descrambler counter ctr may be initialized. The counter-mode descrambler counter may be pixel-addressable. For example, the counter-mode descrambler counter ctr may be initialized as an AES128 bit counter. In step 1306, the key K may be loaded into the descrambler. In step 1308, the row size may be calculated by utilizing the following expression:

$$ROW\_SIZE = \left[\frac{frame\_horizontal\_size \times \eta \times bit\_precision + n}{n}\right] \times n$$

where η=1.5 for chroma with 4:2:0 video, η=2 for chroma with 4:2:2 video, and η=3 for chroma with 4:4:4 video, bit_precision=8 for 8-bit video, for example, and n is the size of the block cipher, for example, for the block cipher with AES128, n=128. Notwithstanding, in accordance with an embodiment of the invention, a multiple or sub-multiple of the row size may be utilized.

In step 1310, the pad $E_K$(ctr)∥$E_K$(ctr+1)∥$E_K$(ctr+2)∥ . . . ∥$E_K$(ctr+m), where m is an integer may be generated with the size of the row size ROW_SIZE. The scrambled data along with its corresponding horizontal pixel address may be stored in an internal secure RAM. In step 1312, the frame buffers may be arranged in raster scan or line order with interleaved YCbCr for each pixel. Notwithstanding, in accordance with an embodiment of the invention, any combination of a plurality of lines, such as arranging every two or three lines in raster scan order may be utilized. Each line of decoded pixels M is the plaintext. In step 1314, for each pixel line, the plaintext M may be generated by XORing the ciphertext C and the first |C| bits of the pad $E_K$(ctr)∥$E_K$(ctr+1)∥$E_K$(ctr+2)∥ . . . ∥$E_K$(ctr+m), where m is an integer. In step 1316, it may be determined whether the counter-mode descrambler counter ctr and key K needs to be initialized. If the counter-mode descrambler counter ctr and key K needs to be initialized, control passes to step 1304. If the counter-mode descrambler counter ctr and key K are not initialized, control passes to end step 1318.

The scrambling and/or descrambling process may be frame buffer line based. The scrambling and/or descrambling process may be for a line of interleaved pixels or a multiple number of lines of interleaved pixels or a sub-multiple of a line of interleaved pixels. For each block or macroblock, the scrambling and/or descrambling process may be performed by XORing each line of pixels with $E_K$(ctr)∥$E_K$(ctr+1)∥$E_K$(ctr+2)∥ . . . ∥$E_K$(ctr+m), where m is an integer at its corresponding address location. The cryptographic operations involved in enciphering a plaintext string M may be independent of the plaintext string M. As a result, preprocessing may be utilized to increase speed and efficiency of the cryptographic operations. The pad $E_K$(ctr)∥$E_K$(ctr+1)∥$E_K$(ctr+2)∥ . . . ∥$E_K$(ctr+m), where m is an integer may be calculated in spare cycles before the plaintext string M is known. When the plaintext string M is known, it is XORed with the computed pad. In an embodiment of the invention, the i-th ciphertext block, Ci, may be scrambled in a random-access fashion. For motion compensation, bulk data may be fetched based on the motion vector. The reference frame buffer for motion compensation in the data fetching process may be similar to reference frame buffer without the scrambler.

In accordance with an embodiment of the invention, in one exemplary usage scenario, during scrambling an integer counter or nonce, initially 0, for example, may be maintained to generate the string ctr as the 128-bit string that encodes the number nonce.$2^{64}$, for example. The nonce may be regarded as a 64-bit binary number and ctr may be constructed by appending to this 64-bit binary number, 64 zero-bits. The number nonce may be incremented following each encryption. The ciphertext C may be transmitted along with a string, which may encode a nonce. In accordance with an embodiment of the invention, the images in the frame buffers may be scrambled securely, for example, by a strong cipher such as AES. The scrambling and/or descrambling may be transparent to the video decompression engine. For example, scrambling and/or descrambling may be separated with video decoder design. The method utilized for scrambling and/or descrambling may be compatible with the existing video compression standards, for example, motion picture experts' group (MPEG)-2 video and MPEG-4 advanced video coding (AVC (H.264)). The scrambling and/or descrambling process may also be included in both field and frame coding for interlaced and progressive contents. The arrangement of scrambled frame buffers and the descrambling process may be designed for minimizing implementation complexity, for example, without increasing bandwidth of memory access. Scrambling and/or descrambling processes may be adapted to satisfy throughput requirements.

In accordance with an embodiment of the invention, a system for protecting image data in a video compression system may comprise an encryption engine 606 that encrypts image data utilizing counter-mode scrambling. The video compression system may comprise at least one frame buffer 616 that buffers the encrypted image data. The encryption engine 606 may be adapted to protect a compressed buffered encrypted image data utilizing counter-mode scrambling, for example, the encryption engine 606 may be adapted to protect a compressed buffered encrypted image data stored in a video buffer verifier (VBV). The counter values for the counter mode scrambler counter utilized for encrypting image data may be pixel addressable. The encryption engine 606 may be adapted to initialize a counter-mode scrambler counter 622. The encryption engine may be adapted to load an encryption key generated by the key generator 610 to perform the counter-mode scrambling. The encryption engine 606 may be adapted to calculate a row size of an encryption cipher to perform the counter-mode scrambling. The encryption engine 606 may be adapted to generate a pad $E_K(ctr)\|E_K(ctr+1)\|E_K(ctr+2)\| \ldots \|E_K(ctr+m)$, where m is an integer of the encryption cipher utilizing the calculated row size. To encrypt using counter-mode scrambling, a plaintext string M, a key K and a counter ctr may be utilized by the encryption engine 606. The plaintext M may be an arbitrary bit string. The counter ctr may be an n-bit string. To decrypt the ciphertext, the plaintext string M may be XORed with C and the first |C| bits of the pad $E_K(ctr)\|E_K(ctr+1)\|E_K(ctr+2)\| \ldots \|E_K(ctr+m)$, where m is an integer. The process of descrambling may be similar to scrambling with M and C interchanged.

The encryption engine 606 may be adapted to store the encrypted image data along with its corresponding horizontal pixel address in an internal random access memory (RAM) 620. The encryption engine 606 may be adapted to arrange the buffered encrypted image data in raster scan order. The encryption engine 606 may be adapted to generate the encrypted image data by exclusive-oring (XORing) at least one plaintext string M of the image data and first |M| bits of a generated pad $E_K(ctr)\|E_K(ctr+1)\|E_K(ctr+2)\| \ldots \|E_K(ctr+m)$, where m is an integer. The encryption engine 606 may be adapted to pre-process the generated pad $E_K(ctr)\|E_K(ctr+1)\|E_K(ctr+2)\| \ldots \|E_K(ctr+m)$, where m is an integer in spare cycles to improve efficiency. The encryption engine 606 may be adapted to protect the buffered encrypted image data utilizing counter-mode scrambling, wherein the buffered encrypted image data is compressed.

In accordance with an embodiment of the invention, a system for protecting image data in a video compression system may comprise at least one frame buffer 816 that buffers the encrypted image data. The video compression system may comprise a decryption engine 806 that decrypts buffered encrypted image data utilizing counter-mode descrambling. The decryption engine 806 may be adapted to protect a compressed buffered encrypted image data utilizing counter-mode descrambling, for example, the decryption engine 806 may be adapted to protect a compressed buffered encrypted image data stored in a video buffer verifier (VBV). The counter values for the counter mode descrambler counter utilized for encrypting image data may be pixel addressable. The decryption engine 806 may be adapted to initialize a counter-mode descrambler counter 822. The decryption engine 806 may be adapted to load a decryption key generated by the key generator 810 to perform the counter-mode descrambling. The decryption engine 806 may be adapted to calculate a row size of a decryption cipher to perform the counter-mode descrambling. The decryption engine 806 may be adapted to generate a pad $E_K(ctr)\|E_K(ctr+1)\|E_K(ctr+2)\| \ldots \|E_K(ctr+m)$, where m is an integer of the decryption cipher utilizing the calculated row size.

The decryption engine 806 may be adapted to store the encrypted image data along with its corresponding horizontal pixel address in an internal random access memory (RAM) 820. The decryption engine 806 may be adapted to arrange the buffered encrypted image data in raster scan order. The decryption engine 806 may be adapted to generate the decrypted buffered encrypted image data by exclusive-oring (XORing) at least one ciphertext string C of the encrypted image data and first |C| bits of a generated pad $E_K(ctr)\|E_K(ctr+1)\|E_K(ctr+2)\| \ldots \|E_K(ctr+m)$, where m is an integer. The decryption engine 806 may be adapted to pre-process the generated pad $E_K(ctr)\|E_K(ctr+1)\|E_K(ctr+2)\| \ldots \|E_K(ctr+m)$, where m is an integer in spare cycles to improve efficiency. The decryption engine 806 may be adapted to protect the buffered encrypted image data utilizing counter-mode descrambling, wherein the buffered encrypted image data is compressed.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for protecting image data in a video compression system, the system comprising:
   one or more circuits for use in an encryption engine, said one or more circuits configured to:
   encrypt image data utilizing counter-mode scrambling, said encrypting based on calculation of a row size of an encryption cipher; and
   buffer said encrypted image data in at least one frame buffer.

2. The system according to claim 1, wherein said one or more circuits are configured to initialize a counter-mode scrambler counter to perform said counter-mode scrambling, wherein counter values for said counter mode scrambler counter utilized for said encrypting are pixel addressable.

3. The system according to claim 1, wherein said one or more circuits are configured to load an encryption key to perform said counter-mode scrambling.

4. The system according to claim 1, wherein said one or more circuits are configured to generate a ciphertext of said encrypted image data based on said calculated row size of said encryption cipher.

5. The system according to claim 1, wherein said one or more circuits are configured to store said encrypted image data along with its corresponding horizontal pixel address in an internal random access memory (RAM).

6. The system according to claim 1, wherein said one or more circuits are configured to arrange said buffered encrypted image data in raster scan order.

7. The system according to claim 1, wherein said one or more circuits are configured to generate said encrypted image data by exclusive-oring (XORing) at least one plaintext string M of said image data and a first |M| bits of a generated pad.

8. The system according to claim 7, wherein said one or more circuits are configured to pre-process said generated pad using spare processing cycles.

9. The system according to claim 1, wherein said encryption engine is configured to protect said buffered encrypted image data utilizing said counter-mode scrambling, wherein said buffered encrypted image data is compressed.

10. A method for protecting image data in a video compression system, the method comprising:
    performing by one or more processors and/or circuits:
    buffering encrypted image data in a frame buffer, wherein said image data is encrypted based on calculation of a row size of an encryption cipher.

11. A system for protecting image data in a video compression system, the system comprising:
    one or more circuits for use in a decryption engine, said one or more circuits configured to:
    buffer encrypted image data in one or more frame buffers; and
    decrypt said buffered encrypted image data utilizing counter-mode descrambling, said decrypting based on calculation of a row size of a decryption cipher.

12. The system according to claim 11, wherein said one or more circuits are configured to initialize a counter-mode descrambler counter to perform said counter-mode descrambling, wherein counter values for said counter mode descrambler counter utilized for said decrypting are pixel addressable.

13. The system according to claim 11, wherein said one or more circuits are configured to load a decryption key to perform said counter-mode descrambling.

14. The system according to claim 11, wherein said one or more circuits are configured to decrypt a ciphertext of said encrypted image data based on said calculated row size of said decryption cipher.

15. The system according to claim 11, wherein said one or more circuits are configured to store said buffered encrypted image data along with its corresponding horizontal pixel address in an internal random access memory (RAM).

16. The system according to claim 11, wherein said one or more circuits are configured to arrange said buffered encrypted image data in raster scan order.

17. The system according to claim 11, wherein said one or more circuits are configured to generate said decrypted buffered encrypted image data by exclusive-oring (XORing) at least one ciphertext C of said buffered encrypted image data and a first |C| bits of a generated pad.

18. The system according to claim 17, wherein said one or more circuits are configured to pre-process said generated pad using spare processing cycles.

19. The system according to claim 11, wherein said one or more circuits are configured to protect said buffered encrypted image data utilizing said counter-mode descrambling, wherein said buffered encrypted image data is compressed.

20. The system according to claim 11, wherein said one or more circuits are configured to generate a pad $E_K(ctr)\|E_K(ctr+1)\|E_K(ctr+2)\| \ldots \|E_K(ctr+m)$, where m is an integer of said decryption cipher utilizing said calculated row size, where $E_K(X)$ denotes decipherment of an n-bit block X using a decryption key K and a block cipher E and ctr is a counter-mode descrambler counter.

* * * * *

UNITED STATES PATENT AND TRADEMARK OFFICE
CERTIFICATE OF CORRECTION

PATENT NO. : 8,503,671 B2
APPLICATION NO. : 13/326984
DATED : August 6, 2013
INVENTOR(S) : Chen Xuemin It is certified that error appears in the above-identified patent and that said Letters Patent is hereby corrected as shown below:

In the claims

Column 16, Line 48, please replace "integerof" with --integer of--.

Signed and Sealed this
Fifteenth Day of October, 2013

Teresa Stanek Rea
*Deputy Director of the United States Patent and Trademark Office*